G. FORNACA.
MOTOR CONTROL.
APPLICATION FILED JAN. 12, 1920.
1,438,174.
Patented Dec. 12, 1922.
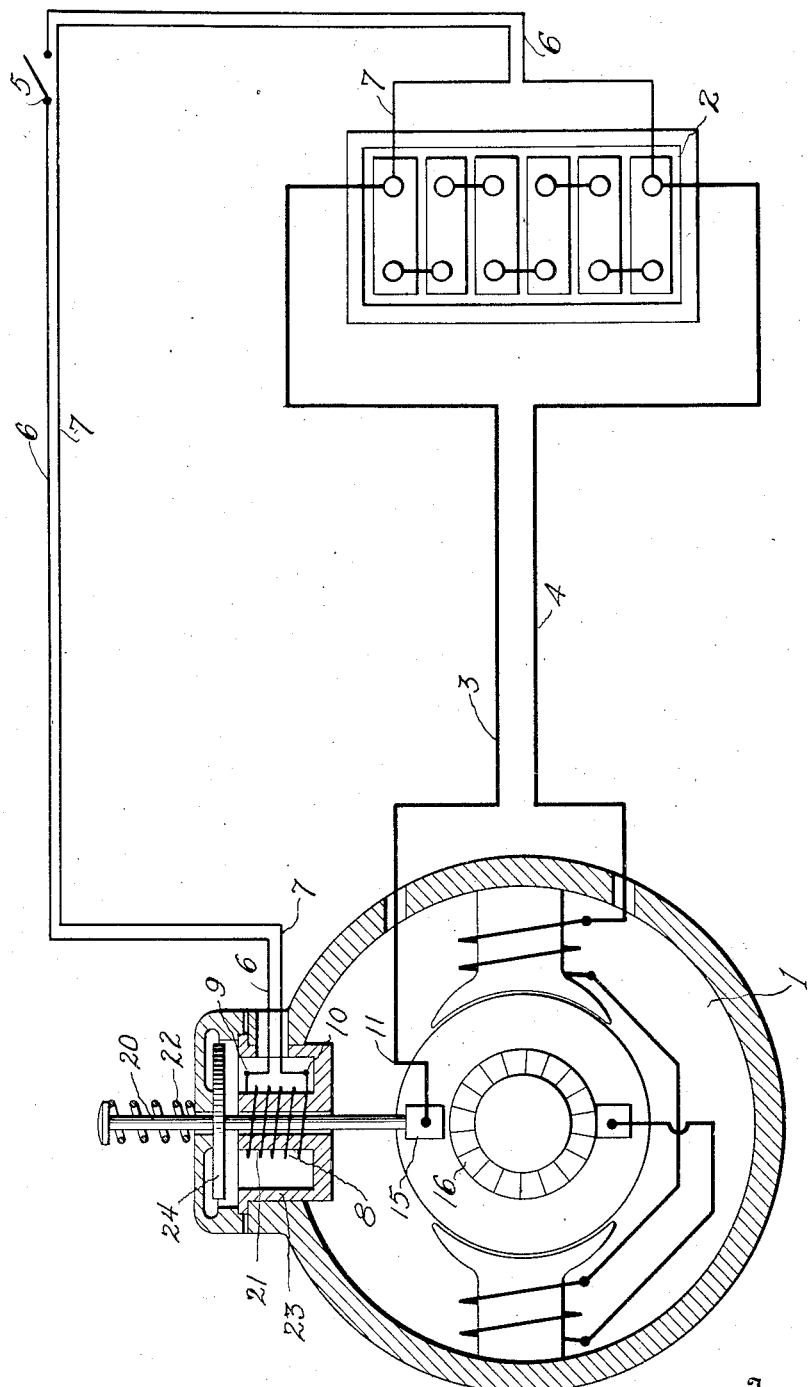
Inventor
Guido Fornaca
By his Attorneys
Edwards, Sager & Bauer Patented Dec. 12, 1922.

1,438,174

UNITED STATES PATENT OFFICE.

GUIDO FORNACA, OF TURIN, ITALY.

MOTOR CONTROL.

Application filed January 12, 1920. Serial No. 351,063.

(GRANTED UNDER THE PROVISIONS OF THE ACT OF MARCH 3, 1921, 41 STAT. L., 1313.)

*To all whom it may concern:*

Be it known that I, GUIDO FORNACA, a subject of the King of Italy, residing at Turin, Province of Piedmont, Italy, have invented certain new and useful Improvements in Motor Controls (for which I have filed applications in Italy, May 26, 1917, now patented, No. 471/33; in France, Aug. 11, 1917; in England, Aug. 22, 1917), of which the following is a specification.

This invention relates to motor controlling apparatus and particularly to the control of the connection between the starting motor and battery of an automobile. The object of the invention is to control the main circuit of high amperage by an auxiliary circuit of low amperage so that the controlling means may be positioned at a point remote from the motor or battery without excessive loss in resistance of the installation of cumbersome cables.

A further object of the invention is to utilize the contact between the motor commutator and its brush to control the motor circuit and in this way reduce the extra installation required for the control means.

In the accompanying drawing, the figure shows diagrammatically a system embodying this invention.

In the embodiment of the invention shown in the drawings a series wound direct current motor 1 receives its current from a battery of cells 2 to which the motor is directly connected by cables 3 and 4, of large cross section to reduce resistance to a minimum and having the shortest length necessary to connect the motor and battery.

To provide for the making and breaking of the circuit at a distant point 5 relatively high resistance wires 6, 7 connect the battery 2 with the solenoid 8 at points 9, 10 and the circuit of one of these wires 6 is interrupted by the remote control means 5, it being obvious that in the system shown the wire 7 may be omitted if desired and the solenoid terminal 10 at the motor connected to the cable 3 at the motor terminal 11. The energizing or deenergizing of solenoid 8 controls the main motor current and in the embodiment shown this is done by moving the brush 15 into or out of contact with its commutator 16. The brush 15 is mounted on a rod 20 of magnetic material passing through the core 21 of the solenoid and being held normally raised by spring 22 to break the main circuit. The magnetic circuit of the core 21 is completed by the surrounding cylinder 23 and the disk 24 fast on spindle 20 so that when the control means or switch 5 is closed the current through the solenoid presses the brush 15 down into contact with the commutator 16 and holds it there by a very small current in the solenoid 8, completing the circuit through the motor. When the engine has been started the breaking of the auxiliary circuit at 5 deenergizes the solenoid and permits the spring 22 to raise brush 15 and break the motor circuit.

By this invention there is attained a maximum of driving current and efficiency with a minimum of material and expense. The cables 3, 4 being of shortest possible length and out of the way may be of negligible resistance without being costly or cumbersome while the use of the brush movement dispenses with an extra switch in this main circuit. In the auxiliary circuit the current may be so small as to be negligible and thus practically all of the battery energy is delivered to the motor in a very efficient and inexpensive manner.

I claim:—

1. In a starting system for an automobile, the combination with a motor having a commutator and brushes, of a battery, and means for controlling the circuit from said battery through said motor comprising a rod connected to one of said brushes, an armature disk connected to said rod, and a magnet for attracting said armature disk, said rod passing through said magnet, and said disk being biased to a position away from said magnet and having an air gap between said disk and said magnet, the attraction of said disk by the magnet causing the magnetic resistance to be lowered by decreasing said air gap as the brush approaches the commutator.

2. In a starting system for an automobile, the combination of a motor having a commutator and brushes, a battery, connecting leads directly between said battery and said motor, one of said brushes being biased to normally remain out of contact with the commutator of the motor, and electromagnetic means for bringing said brush in contact with the commutator comprising a magnet having a central core and an outer cylindrical portion, a winding between said core and outer portion, and a disk opposite the ends of said central core and outer portion and mechanically connected to said brush.

Ing. GUIDO FORNACA.